March 18, 1969  V. THOMPSON  3,433,078

SLUDGE SAMPLER

Filed April 8, 1966

INVENTOR
VAUGHAN THOMPSON

BY
George M. Zukes
ATTORNEY

United States Patent Office 3,433,078
Patented Mar. 18, 1969

3,433,078
SLUDGE SAMPLER
Vaughan Thompson, Richmond Hill, Ontario, Canada, assignor to Vaughan Thompson Limited, Richmond Hill, Ontario, Canada, a corporation of Ontario
Filed Apr. 8, 1966, Ser. No. 547,059
U.S. Cl. 73—424
Int. Cl. G01n 1/10
3 Claims

ABSTRACT OF THE DISCLOSURE

A sludge sampler which receives the entire sludge discharged from the hole of a rock drilling operation and passes it over a rotary sampling wheel which is provided with a plurality of similar pockets, one of which has an opening which registers with a sample conduit on each revolution of the wheel. The wheel is driven by the flowing sludge and will thus extract a sample having a constant ratio to the whole; the proportion of the sample being regulated by the number of pockets arranged around the circumference of the wheel. The sampling wheel is automatic, being turned by the input flow which is positive even at low volume.

---

This invention relates to the collection of samples from a flow of material. In particular, the invention relates to a device for collecting a sample of sludge from the sludge flow of a drilling operation in mineral exploration for analysis of the mineral content thereof.

In the following description, the invention will be described in use for collecting a measured portion of the total sludge flow for sampling of the sludge flowing from the drill hole during the drilling but it is not limited to such application.

Such sludge sampling is often useful during an ore drilling operation since small pieces of ore and ore particles which have been finely ground by the cutting action of the drill bit combine with the sludge and are removed from the drill hole in the sludge flow. A disadvantage of the present practice is that the full flow of sludge is run into a settling box with the result that an unnecessarily large quantity of sludge is collected. As the flow is constant, a large size settling tank is required to insure that all of the cuttings settle out and are not, in part, carried away in an overflow. The present invention overcomes that disadvantage by taking samples at spaced intervals, which sample flow is intermittent and allows the cuttings to settle out in a relatively small collecting receptacle such as a porous filter bag, which catches the sludge including the flocculent material that would otherwise float away. This also avoids contamination from previous residue as was often experienced with previous sludge sampling.

A sampling device for automatically extracting, from a flowing fluid, a predetermined quantity of the fluid comprising:
(a) a rotatable member;
(b) fluid guide means directing the flowing fluid over the periphery of the member;
(c) a separate sampling fluid way having a sample inlet periodically exposed to the flowing fluid at timed intervals controlled by the rotation of said member and a discharge communicating with a sample collecting receptacle whereby on each rotation of the rotatable member a predetermined quantity of the flowing liquid extracted therefrom and deposited in the collecting receptacle.

Figure 1:
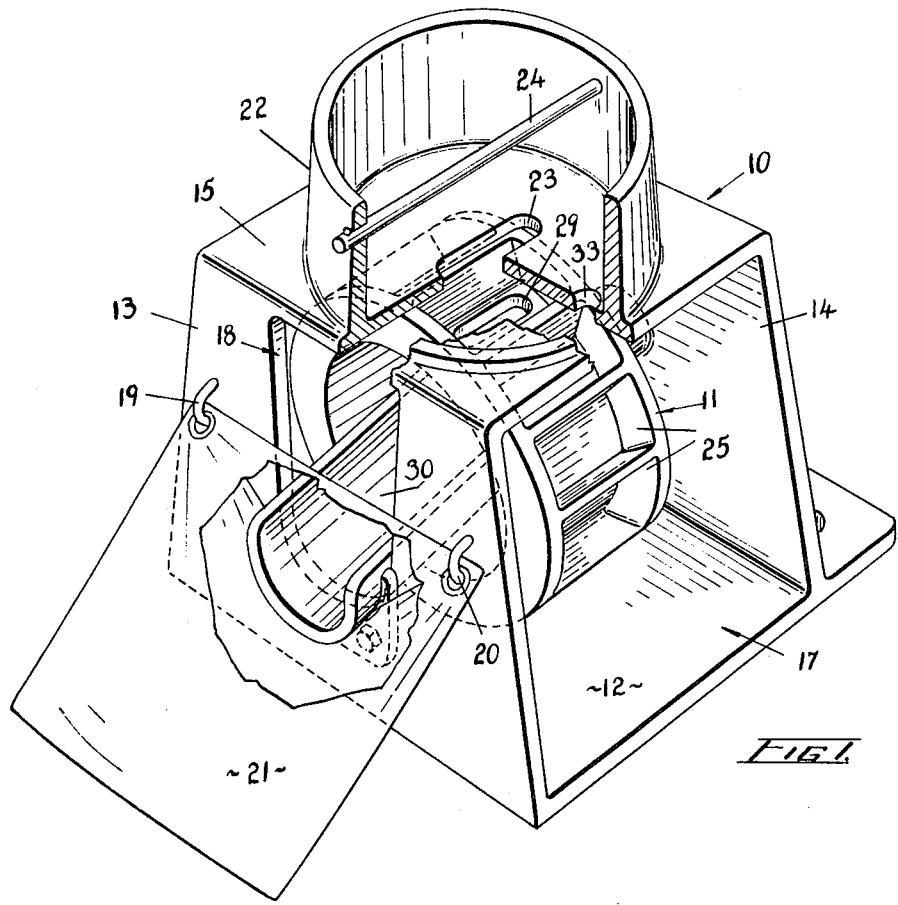
Figure 2:
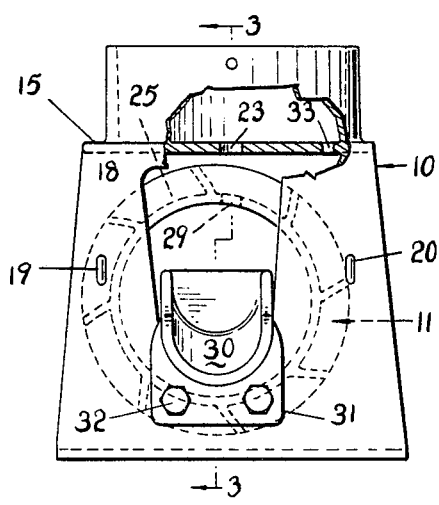
Figure 3:
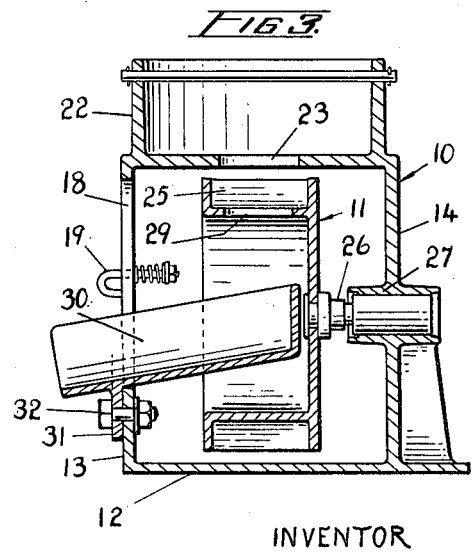

The embodiment of the invention as applied to a sludge sampler will now be described with reference to the accompanying drawings in which
FIG. 1; and FIG. 2 is a side elevation of the sampler shown in FIG. 1; and
FIG. 3 is a sectional view of the sampler taken on the line 3—3 of FIG. 2.

The sampler comprises a hollow casing generally indicated by the numeral 10 and a rotatable member mounted therein and generally indicated by the numeral 11. The casing 10 is formed of cast aluminum and includes a base 12, parallel side walls 13, 14 and a top wall 15 which bridges the walls 13, 14 above the rotatable member 11. The casing 10 is provided with an open front end which forms a fluid outlet 17. The side wall 13 is formed with an opening 18 and hooks 19, 20 for supporting a sample collecting receptacle 21. The top wall 15 carries an annular upstanding rim 22 which forms a sludge collector basin having in the bottom thereof a slot-like aperture 23 which opens into the hollow casing above the rotatable member 11, the rim 22 and aperture 23 forming a fluid inlet through which the sludge flows into the hollow casing as hereinafter described. The positioning of the aperture 23 will be described in conjunction with the axis of rotation of the rotatable member 11. A bar 24 extends across the rim 22 and serves as a handle for carrying the sampling device.

The rotatable member 11 is in the form of a water wheel carrying around the periphery thereof a plurality of buckets 25 of uniform size and spacing, the water wheel having its axle 26 journalled in bearing 27 formed in the side wall 14. The side wall 28 of the water wheel is solid and the open side of the wheel faces the opening 18 in the wall 13. A sample inlet 29 is formed in the periphery of the rotatable member 11 by removing the bottom of one of the buckets 25. Mounted in the opening 18 is a trough 30 which extends into the central portion of the rotatable member so that the inner end lies below the sample inlet 29 in the top position of said inlet. The trough 30 also projects outwardly beyond the wall 13 to form a lip which discharges the fluid into the sample collecting receptacle 21. It will be seen that the trough 30 has a slight gradient and is connected to the wall 13 by means of mounting bracket 31 and bolt 32. The trough 30 hollow interior of the rotatable member 11 and sample inlet 29 form a sampling passage which communicates with the flowing liquid as hereinafter described.

The aperture 23 is slightly offset relative to the axis of rotation of the rotatable member, the offset being in the direction towards the fluid outlet 17. To add to the offset flow a second aperture 33, is positioned between the aperture 23 and the wall 22. The offsetting of the apertures 23 and 33 is to ensure that the rotatable member will not assume a dead center position and will start to rotate when the liquid flow commences. The forward or leading edges of the buckets are set at an angle relative to the axis of rotation to slant in a counterclockwise direction to prevent premature dumping of the buckets during rotation. By this means, maximum efficiency is attained.

The operation of the sampler is as follows. The sludge from the drilling operation is fed into the well formed by the rim 22 then through the aperture 23, into buckets 25 causing the member 11 to rotate. The sludge passes to waste through the fluid outlet 17. During each complete cycle of the rotatable member 11 the aperture 29 will be exposed to the flowing sludge and a sample of sludge having a volume substantially equal to the cubic content of one of the buckets 25 will be extracted from the fluid flow and dumped into the trough 30 which will in turn empty the sample into the receptacle 21. In the present instance, the receptacle 21 is a porous sack so that the water is immediately drained off to leave merely the solids. In the present illustration the rotatable member has eight buckets and consequently the sample will represent one eighth of the total volume of the sludge flowing through the sampling machine.

While this invention has been described with respect to a particular embodiment, it is to be understood that this disclosure has been made by way of illustration and not by way of limitation since it will be apparent that the apparatus can be conveniently adapted to obtaining a sample of other fluids.

What I claim as new and desire to protect by Letters Patent of the United States is:

1. A sampling device for automatically extracting a sample of predetermined volume from a flowing liquid, comprising:
   (a) a hollow casing having a well-like member mounted on the top thereof, said well having a passage communicating with the interior of the casing through which the fluid to be sampled is admitted and flows to a discharge passage;
   (b) a wheel housed in said casing, said wheel being mounted on a horizontal axis for rotation in said casing, said axis of rotation being in vertical alignment with said first named passage;
   (c) said wheel having a plurality of bucket type impellers on the periphery thereof; at least one of which is bottomless providing a sample inlet passage;
   (d) a separate sampling fluid way communicating, at one end, with the sample inlet and at the other end with a sample discharge passage;
whereby on each rotation of the wheel a predetermined quantity of the flowing liquid is extracted therefrom and deposited in a collecting receptacle.

2. A sampling device for automatically extracting from a flowing liquid a predetermined proportion of that liquid for the purpose of analysis comprising the combination of:
   (a) a hollow casing having a fluid inlet and a fluid outlet;
   (b) a rotatable member mounted in said casing in the path of said flowing liquid passing from said inlet to said outlet, said member having a plurality of bucket type impellers on the periphery thereof and the said fluid inlet is located above said impellers;
   (c) said member having a sampling passage provided with a sample inlet communicating with the flowing liquid and a discharge passage communicating with a collection receptacle, said sampling passage comprising a downwardly sloping trough mounted in said casing and having an extension located below the sample inlet;
whereby on each revolution of the rotatable member a test sample of the flowing liquid is extracted therefrom and deposited in the collection receptacle.

3. A sampling device according to claim 1 in which the wheel is a hollow cylinder and the sampling fluid way comprises a trough extending in the central portion of said wheel with its inner higher end positioned below the bucket type impellers and its lower end projecting from said wheel.

References Cited
UNITED STATES PATENTS

| 304,259 | 8/1886 | Brunton | 73—423 |
| 608,834 | 8/1898 | Byrnes | 73—424 |
| 665,620 | 1/1901 | Stephens | 73—424 |
| 888,471 | 5/1908 | Constant | 73—424 |

S. CLEMENT SWISHER, *Primary Examiner.*

U.S. Cl. X.R.

355—89, 99, 132